United States Patent
Liu et al.

(10) Patent No.: US 9,820,128 B2
(45) Date of Patent: Nov. 14, 2017

(54) METHOD AND APPARATUS FOR DYNAMIC CHARGING OVER MULTIPLE NETWORK NODES

(71) Applicant: Nokia Technologies Oy, Espoo (FI)

(72) Inventors: Yang Liu, Beijing (CN); Haitao Li, Beijing (CN)

(73) Assignee: Nokia Technologies Oy, Espoo (FI)

(*) Notice: Subject to any disclaimer, the term of this patent is extended or adjusted under 35 U.S.C. 154(b) by 0 days.

(21) Appl. No.: 14/784,033

(22) PCT Filed: May 7, 2013

(86) PCT No.: PCT/CN2013/075247
§ 371 (c)(1),
(2) Date: Oct. 12, 2015

(87) PCT Pub. No.: WO2014/179933
PCT Pub. Date: Nov. 13, 2014

(65) Prior Publication Data
US 2016/0073247 A1    Mar. 10, 2016

(51) Int. Cl.
*H04M 11/00* (2006.01)
*H04W 4/24* (2009.01)
(Continued)

(52) U.S. Cl.
CPC ........... *H04W 4/24* (2013.01); *H04L 12/1403* (2013.01); *H04M 15/31* (2013.01); *H04M 15/66* (2013.01);
(Continued)

(58) Field of Classification Search
None
See application file for complete search history.

(56) References Cited

U.S. PATENT DOCUMENTS

2004/0101117 A1* 5/2004 Koskinen .............. H04M 15/31
                                                          379/126
2008/0311885 A1* 12/2008 Dawson ............. G06Q 10/1091
                                                          455/406
(Continued)

FOREIGN PATENT DOCUMENTS

CN    101867910 A    10/2010
CN    102104857 A     6/2011
(Continued)

OTHER PUBLICATIONS

International Search Report and Written Opinion received for corresponding Patent Cooperation Treaty Application No. PCT/CN2013/075247, dated Feb. 12, 2014, 9 pages.
(Continued)

*Primary Examiner* — Erika Washington
(74) *Attorney, Agent, or Firm* — Mintz Levin Cohn Ferris Glovsky and Popeo, P.C.

(57) ABSTRACT

A method, a corresponding apparatus, and a computer program product for dynamic charging over multiple network nodes. The method comprises collecting, at a first network node which has a first connection with a user equipment, charging information with respect to a second connection established between the user equipment and a second network node, wherein the second network node is connected with the first network node. The method also comprises combining charging information with respect to the first connection and the charging information with respect to the second connection. The method additionally comprises sending the combined charging information from the first network node to a core network entity for charging the user equipment. With the claimed inventions, the core network and wireless operators could be able to bill the services based on specific offloaded bearers considering
(Continued)

associated QoS information, regarding to the case of multi-PLMN scenarios under network sharing.

15 Claims, 3 Drawing Sheets

(51) Int. Cl.
*H04L 12/14* (2006.01)
*H04M 15/00* (2006.01)
*H04W 16/00* (2009.01)

(52) U.S. Cl.
CPC ....... *H04M 15/8016* (2013.01); *H04W 16/00* (2013.01)

(56) References Cited

U.S. PATENT DOCUMENTS

| | | | |
|---|---|---|---|
| 2012/0165017 A1 | 6/2012 | Kim et al. | |
| 2013/0182644 A1* | 7/2013 | Kim | H04W 76/025 370/328 |
| 2015/0133081 A1* | 5/2015 | Griot | H04L 12/1435 455/407 |

FOREIGN PATENT DOCUMENTS

| | | |
|---|---|---|
| EP | 2509256 A1 | 10/2012 |
| EP | 2521414 A1 | 11/2012 |
| WO | 2012021587 A2 | 5/2012 |

OTHER PUBLICATIONS

Alcatel-Lucent Shanghai Bell, et al., "Discussion on the RRC protocol supporting dual connectivity", 3rd Generation Partnership Project (3GPP) TSG RAN WG2 Meeting #81bis, R2-131352, Chicago, Apr. 15-19, 2013.

European Search Report (Supplementary) for Application No. PCT/CN2013075247, issued Dec. 2, 2016. (4 Pages).

Intel Corporation, "S1 versus X2 Approach for Dual Connectivity", 3rd Generation Partnership Project (3GPP) TSG RAN WG2 Meeting #81bis, R2-131403, Chicago, Apr. 15-19, 2013.

\* cited by examiner

METHOD AND APPARATUS FOR DYNAMIC CHARGING OVER MULTIPLE NETWORK NODES

RELATED APPLICATION

This application was originally filed as Patent Cooperation Treaty Application No. PCT/CN2013/075247 filed May 7, 2013.

FIELD OF THE INVENTION

Embodiments of the present invention generally relate to wireless communication techniques including the 3GPP (the 3rd Generation Partnership Project) LTE (Long Term Evolution) technique. More particularly, example embodiments of the present invention relate to a method and an apparatus for dynamic charging over multiple network nodes.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the specification and claims in this application and is not admitted to be prior art by inclusion in this section.

Various abbreviations that appear in the specification and/or in the drawing figures are defined as below:
AP Access Point
AS Access Stratum
ARP Allocation and Retention Priority
BS Base Station
CN Core Network
eNB evolved Node B
E-RAB E-UTRAN Radio Access Bearer
E-UTRAN Evolved Universal Terrestrial Radio Access Network
ECGI E-UTRAN Cell Global Identifier
GPRS General Packet Radio Service
GW Gateway
HLR Home Location Register
HSS Home Subscriber Server
IP Internet Protocol
MME Mobility Management Entity
MSC Mobile Switching Centre
NAS Non Access Stratum
OAM Operations, Administrations and Maintenance
PDU Protocol Data Unit
PLMN Public Land Mobile Network
PCRF Policy and Charging Enforcement Function
QoS Quality of Service
QCI QoS Class Identifier
SCE Small Cell Enhancement
S1AP S1 Application Protocol
TAI Tracking Area Identifier
UE User Equipment A UE may connect to an eNB, for example, a macro eNB or a small cell (for example, Femto or Pico cell). The charging for such a connection is done based on UE's subscription information, for example, selected PLMN information associated with relevant QoS guarantee. According to the 3GPP Release 12 SCE, a small cell may be deployed as a separate eNB (known as small eNB) with a non-ideal backhaul connection to the macro eNB. The UE might be able to connect to both macro and small eNBs for dual connectivity operations.

SUMMARY OF THE INVENTION

The following presents a simplified summary of the present invention in order to provide a basic understanding of some aspects of the present invention. It should be noted that this summary is not an extensive overview of the present invention and that it is not intended to identify key/critical elements of the present invention or to delineate the scope of the present invention. Its sole purpose is to present some concepts of the present invention in a simplified form as a prelude to the more detailed description that is presented later.

Example embodiments of the present invention would provide for an efficient way of dynamically charging the UE for connections over multiple network nodes, such as two connections respectively with a macro BS and a small cell BS, thereby providing a charging mechanism for the wireless operators.

According to one aspect of the present invention, there is provided a method. The method comprises collecting, at a first network node which has a first connection with a user equipment, charging information with respect to a second connection established between the user equipment and a second network node, wherein the second network node is connected with the first network node. The method also comprises combining charging information with respect to the first connection and the charging information with respect to the second connection. The method additionally comprises sending the combined charging information from the first network node to a core network entity for charging the user equipment.

In an example embodiment, the collecting of the charging information with respect to the second connection is in response to an offloaded request sent from the first network node to the second network node.

In another example embodiment, the charging information with respect to the second connection includes a public land mobile network identifier associated with the second network node and information relating to at least one of metrics indicating the usage of radio resources provided by the second network node or guaranteed transmitted bit rates.

In a further example embodiment, the method also comprises collecting updated charging information with respect to the second connection from the second network node when the charging information with respect to the second connection is changed.

In yet another example embodiment, the method also comprises receiving, from the second network node, a stop-charging instruction to stop charging the user equipment for the second connection upon disconnection of the second connection.

In an additional example embodiment, the sending the combined charging information includes sending the combined charging information via an uplink non access stratum message or a location report message.

In an example embodiment, the first network node includes a macro BS, the second network includes a small cell BS, and the core network entity includes a PCRF.

According to another aspect of the present invention, there is provided an apparatus. The apparatus comprises means for collecting, at a first network node which has a first connection with a user equipment, charging information with respect to a second connection established between the user equipment and a second network node, wherein the second network node is connected with the first network node. The apparatus also comprises means for combining charging information with respect to the first connection and the charging information with respect to the second connection. The apparatus additionally comprises means for sending the combined charging information from the first network node to a core network entity for charging the user equipment.

According to a further aspect of the present invention, there is provided an apparatus. The apparatus comprises at least one processor and at least one memory including computer program instructions. The at least one memory and computer program instructions are configured to, with the at least one processor, cause the apparatus at least to collect, at a first network node which has a first connection with a user equipment, charging information with respect to a second connection established between the user equipment and a second network node, wherein the second network node is connected with the first network node. The at least one memory and computer program instructions are also configured to, with the at least one processor, cause the apparatus at least to combine charging information with respect to the first connection and the charging information with respect to the second connection. The at least one memory and computer program instructions are additionally configured to, with the at least one processor, cause the apparatus at least to send the combined charging information from the first network node to a core network entity for charging the user equipment.

According to yet another aspect of the present invention, there is provided a computer program product. The computer program product comprises at least one computer readable storage medium having a computer readable program code portion stored thereon. The computer readable program code portion comprises program code instructions for collecting, at a first network node which has a first connection with a user equipment, charging information with respect to a second connection established between the user equipment and a second network node, wherein the second network node is connected with the first network node.

The computer readable program code portion also comprises program code instructions for combining charging information with respect to the first connection and the charging information with respect to the second connection. The computer readable program code portion also comprises program code instructions for sending the combined charging information from the first network node to a core network entity for charging the user equipment.

By virtue of the above aspects and multiple example embodiments of the present invention, the CN and wireless operators could be able to bill the services based on for example, specific offloaded bearers considering associated QoS information, regarding to the case of multi-PLMN scenarios under network sharing. Further, the charging mechanism as proposed by the example embodiments of the present invention utilizes the existing procedure as much as possible and thereby decreases the signaling impact to the CN in an acceptable range.

BRIEF DESCRIPTION OF THE DRAWINGS

The example embodiments of the present invention that are presented in the sense of examples and their advantages are explained in greater detail below with reference to the accompanying drawings, in which.

DETAILED DESCRIPTION OF EMBODIMENTS

The example embodiments of the present invention propose collecting the charging information with respect to the connection established between the UE and a second network node (for example, a small cell BS) in addition to the charging information with respect to the connection established between the UE and the first network node (for example, a macro BS). Subsequent to the collecting of the charging information, the first network node may send the combined charging information with respect to the two connections to a CN entity (for example, PCRF responsible for charging). In this manner, the charging issue under the dual connectivity scenario can be effectively and efficiently addressed.

The detailed description of the example embodiments of the present invention will be made in connection with the accompanying drawings.

Figure 1:
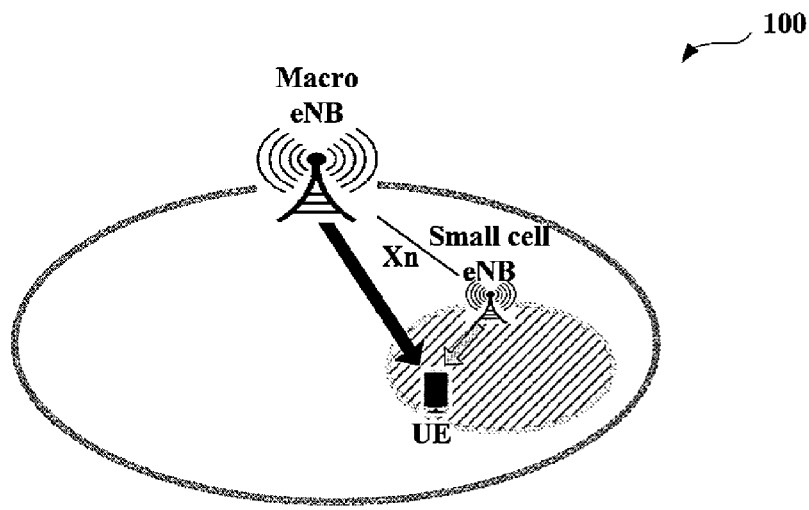
FIG. 1 illustrates a network architecture in which the example embodiments of the present invention may be practiced.

FIG. 1 illustrates a network architecture in which the example embodiments of the present invention may be practiced. As illustrated in FIG. 1, in the heterogeneous network ("HetNet" for short) 100, a UE is in connection with a macro eNB and a small cell eNB, for example, in a dual connectivity mode. The coverage areas of the eNBs are depicted by ellipses of different sizes, wherein the coverage area of the macro eNB is much larger than that of the small cell eNB and overlays the coverage area of the small cell eNB. The macro eNB may be connected to the small cell eNB via an interface, for example an X2 interface.

In the above illustrated network 100, when considering the multi-operator case where the small cells (cluster) are shared between different operators, a macro eNB belonging to PLMN 1 may offload all or a portion of a UE's traffic to a small cell eNB. The small cell eNB may belong to a different PLMN, such as PLMN 2. The UE in the dual connectivity mode will consume resources from two different PLMNs of different operators, which will pose a challenge to the legacy charging scheme on how to bill the user of the UE under such a situation. Meanwhile the offloading needs to be conducted in a flexible way, which means that the data volume offloaded to the small cell may vary from time to time according to macro eNB's offloading policies. Hence, it is necessary to support the charging function under the network sharing case where the UE is allowed to utilize the dual connectivity towards both the macro cell and the small cell, resulting in a quite different charging scheme from the legacy charging scheme.

Figure 2:
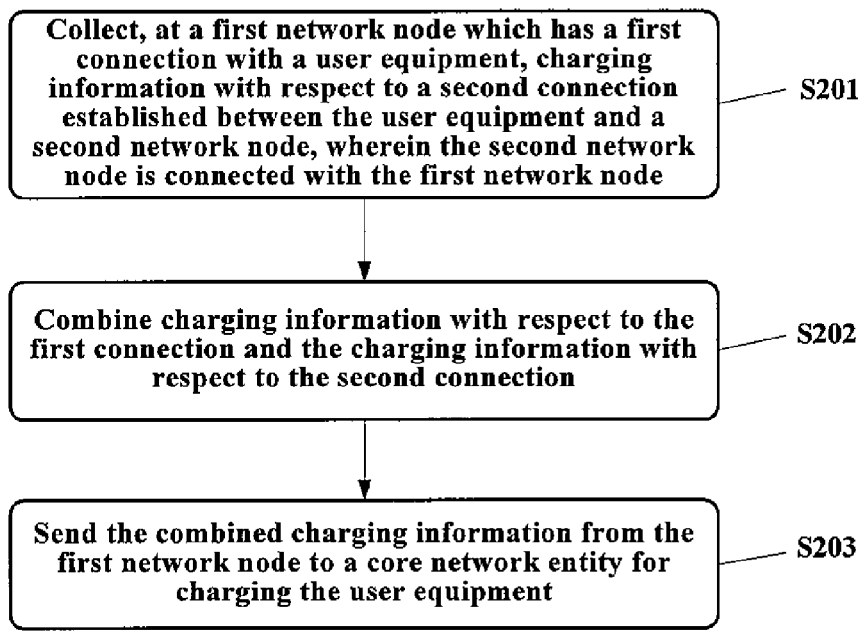
FIG. 2 is a flow chart schematically illustrating a method for dynamic charging over multiple network nodes from a perspective of a first network node (for example, a macro BS), according to an example embodiment of the present invention.

FIG. 2 is a flow chart schematically illustrating a method 200 for dynamic charging over multiple network nodes from a perspective of a first network node (for example, a macro BS), according to example embodiments of the present invention. As illustrated in FIG. 2, at S201, the method 200 collects, at a first network node which has a first connection with a UE, charging information with respect to a second connection established between the UE and a second network node (for example, a small cell BS), wherein the second network node is connected with the first network node. In some example embodiments, the collecting of the charging information with respect to the second connection may be in response to an offload request sent from the first network node to the second network node. In some example embodiments, the charging information with respect to the second connection includes a PLMN identifier associated with the second network node and information relating to at least one of metrics indicating the usage of radio resources provided by the second network node and guaranteed transmitted bit rates.

At S202, the method 200 may combine charging information with respect to the first connection and the charging information with respect to the second connection. At S203, the method 200 sends the combined charging information from the first network node to a core network entity for charging the UE.

In some example embodiments, the method 200 further collects updated charging information with respect to the second connection from the second network node when the charging information with respect to the second connection is changed. In another example embodiment, the method 200 further receives, from the second network node, a stop-charging instruction to stop charging the user equipment for the second connection upon disconnection of the second connection. In a further example embodiment, the sending at S203 includes sending the combined charging information via an uplink NAS message or a location report message.

In the example embodiments as discussed above, the first network node may include a macro BS, the second network node may include a small cell BS, and the core network entity may include a PCRF entity.

With the method 200 and its multiple variants and extensions as discussed in the above example embodiments, CN and/or operators owning different PLMNs could be able to bill the user of the UE for the service based on specific offloaded bearers considering associated QoS information, regarding to the case of multi-PLMN scenarios under the network sharing. In addition, the charging scheme as discussed above utilizes existing procedures as much as possible, thereby decreasing the signaling impact to CN in an acceptable range.

Figure 3:
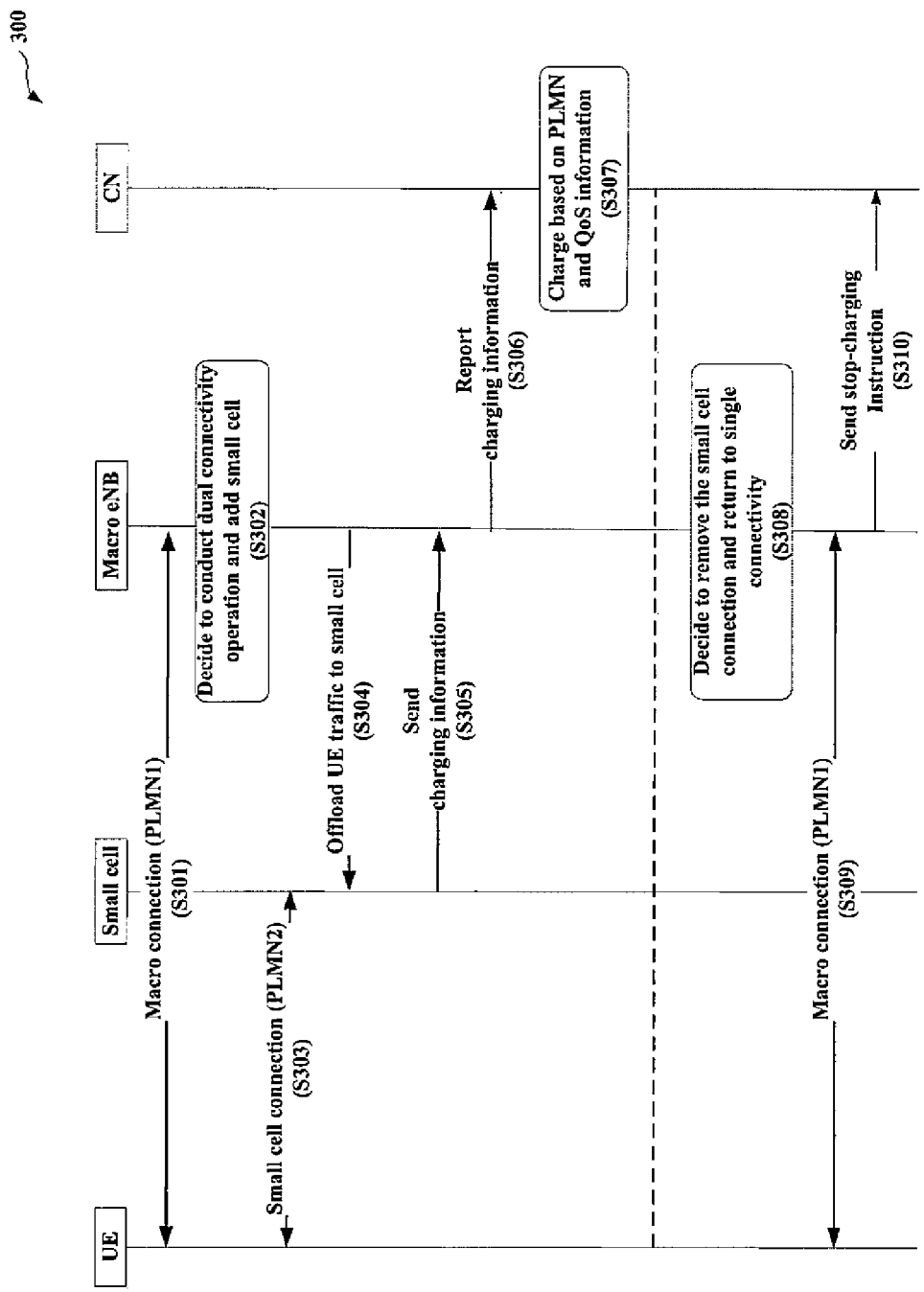
FIG. 3 is a signaling flow of a method for dynamic charging over multiple network nodes according to another example embodiment of the present invention.

FIG. 3 is a signaling flow of a method 300 for dynamic charging over multiple network nodes according to example embodiments of the present invention. As illustrated in FIG. 3, at S301 a UE connects with a macro eNB in a single radio mode via a macro connection provided by PLMN 1. In particular, the macro eNB maintains the macro connection of PLMN 1 with the UE. The charging of the UE for the macro connection, also referred to as "a first connection," is based at least in part on the QoS for the connection. During its movement, the UE may become increasingly closer to a small cell (BS). Upon detection of the small cell and in view of the heavy traffic to that could be delivered to the UE, at S302 the macro eNB may decide to conduct dual connectivity, for example, adding a small cell by performance of an offloading preparation procedure between the macro eNB and the small cell, so as to offload partial traffic to the small cell for the UE, in which case the small cell connection, also referred to as "a second connection," is added in PLMN 2, which is different from the PLMN 1 of macro eNB.

At S304 the macro eNB may offload the partial traffic to the small cell, from which the partial traffic may be directly delivered to the UE. During or before this offloading operation, the small cell may send to the macro eNB the charging information related to the offloaded traffic and needed for charging the UE for the small cell connection. The charging information may include but is not limited to the following:

a. Traffic offloaded to the small cell in PLMN 2, in terms of E-RABs, user data volume, and so on;

b. QoS level of the offloaded traffic to PLMN 2, in terms of QCI, ARP, guaranteed bit rates associated with offloaded bearers or user plane transmission;

c. PLMN information, for example, PLMN 2 in the figure supported in small cell, which is utilized to offload traffic from the macro eNB with PLMN 1. PLMN information of the small cell could be provided to the CN entity (for example, PCRF, connected with MME) for confirming the charging target under the network sharing scenario.

As mentioned above, the sending of the charging information from the small cell to the macro eNB could be merged into the offloading preparation phase between the macro eNB and the small cell, where the small cell may reply to the macro eNB's offload request message by transmission of the essential charging information as a response.

In some example embodiments, the small cell, after sending the initial charging information, may send the updated charging information to the macro eNB when necessary, for instance, when the items of the charging information as illustrated above vary, for example, due to user demand, resource reserved and so on.

Upon receipt of the charging information from the small cell, the macro eNB reports this charging information to the CN (for example, MME/PCRF) via a new S1AP message or reusing existing procedure. In case that eNB receives the updated charging information from the small cell, it may send the updated version of the charging information to the CN such that the previously-stored charging information could be updated to the latest version.

Regarding the charging information or updated version thereof, it can be sent to the CN by the following message as non-limiting examples.

Example 1

Enhanced Uplink NAS Transport Message

This message is sent by the eNB to the MME and is used for carrying NAS information over the S1 interface, in which the dynamic charging information, as bolded and underlined as below, is indicated as a new IE.

Direction: macro eNB to MME

| IE/Group Name | Presence | Range | IE type and reference | Semantics description | Criticality | Assigned Criticality |
|---|---|---|---|---|---|---|
| Message Type | M | | 9.2.1.1 | | YES | ignore |
| MME UE S1AP ID | M | | 9.2.3.3 | | YES | reject |

-continued

| | | | | | |
|---|---|---|---|---|---|
| eNB UE S1AP ID | M | 9.2.3.4 | | YES | reject |
| NAS-PDU | M | 9.2.3.5 | | YES | reject |
| E-UTRAN CGI | M | 9.2.1.38 | | YES | ignore |
| TAI | M | 9.2.3.16 | | YES | ignore |
| GW Transport Layer Address | O | Transport Layer Address 9.2.2.1 | Indicating GW Transport Layer Address if the GW is collocated with eNB | YES | ignore |
| <u>Dynamic charging information</u> | <u>O</u> | <u>xxx</u> | <u>Providing essential information used for charging over multiple network nodes</u> | | | xxx

| IE/Group Name | Presence | Range | IE type and reference | Semantics description |
|---|---|---|---|---|
| E-RAB ID/UP volume | | | | |
| QoS information | | | | |
| PLMN information | | | | |
| . . . | | | | |

In the above enhanced uplink NAS message, the dynamic charging information is available to indicate to the CN multiple going PLMN services and the essential inputs for charging. Then, the CN could be capable of billing the UE based on the offloaded services associated with the relevant QoS information.

Example 2

Enhanced Location Report Message

The charging information, as bolded and underlined as below, is indicated as a new IE in this enhanced location report message and sent by the eNB to the MME.
Direction: macro eNB to MME

| IE/Group Name | Presence | Range | IE type and reference | Semantics description | Criticality | Assigned Criticality |
|---|---|---|---|---|---|---|
| Message Type | M | | 9.2.1.1 | | YES | ignore |
| MME UE S1AP ID | M | | 9.2.3.3 | | YES | reject |
| eNB UE S1AP ID | M | | 9.2.3.4 | | YES | reject |
| E-UTRAN CGI | M | | 9.2.1.38 | | YES | ignore |
| TAI | M | | 9.2.3.16 | | YES | ignore |
| Request Type | M | | 9.2.1.34 | The Request Type IE is sent as it has been provided. | YES | ignore |
| <u>Dynamic charging information</u> | <u>O</u> | | <u>xxx</u> | <u>Providing essential information used for charging over multiple network nodes</u> | | | xxx

| IE/Group Name | Presence | Range | IE type and reference | Semantics description |
|---|---|---|---|---|
| E-RAB ID/UP volume | | | | |
| QoS info | | | | |
| PLMN info | | | | |
| . . . | | | | |

The above enhanced location report message could be provided via a location reporting procedure which is initiated by the MME in the legacy procedure. Additionally or alternatively, for a charging purpose, the eNB could also utilize this location report message to update the charging information in the dual connectivity mode as appropriate.

From the above discussion, it can be seen that the example messaging mechanism can apprise the CN of the charging information with respect to the second connection with few changes to legacy procedures. In addition to the charging information regarding the second connection, the example embodiments of the present invention also combine this charging information with charging information with the first connection, which may be collected under the legacy procedure. Therefore, the charging information as sent at S305 and reported at S306 may include the charging information with respect to the first connection established between the macro eNB and the UE and the charging information with respect to the second connection established between the small cell and the UE for the offloaded traffic.

Upon receiving the combined charging information from the macro eNB, the CN entity, particularly the PCRF connected with the MME, may charge the UE for the two connections based on, for example, the PLMN and QoS information, such as those listed before, at S307.

In time the macro eNB may find that the UE becomes increasingly remote from the small cell or the offloading operation is less necessary due to less traffic pressure, then it may, at S308, decide to remove the small cell connection and direct the UE back into the single connection mode. Upon performance of the disconnection procedure with the small cell, the UE would have only one wireless connection, for example, the first connection with the macro eNB and thereby reenter into the single connectivity mode, as illustrated at S309.

When the UE disconnects from the small cell, the macro eNB may send a stop-charging instruction to the CN reusing for example, the messages as discussed above with respect to the examples 1 and 2, at S310. Based on the time interval running from the second connection being established to the second connection being disconnected, the CN can calculate the fees that the user of the UE should pay for the offloaded traffic. Of course, the charging for the second connection according to example embodiments of the present invention would not affect the charging for the first connection, which will continue until the first connection is disconnected.

With the method 300 as illustrated in FIG. 3 and discussed in detail as above, the wireless operators could be able to charge the service for the offloaded traffic based on the specific offloaded bearers considering the QoS information, regarding to the case of multi-PLMN scenarios. Further, the proposed charging mechanism uses the existing procedure and decreases the signaling impact to the CN as much as possible.

Figure 4:
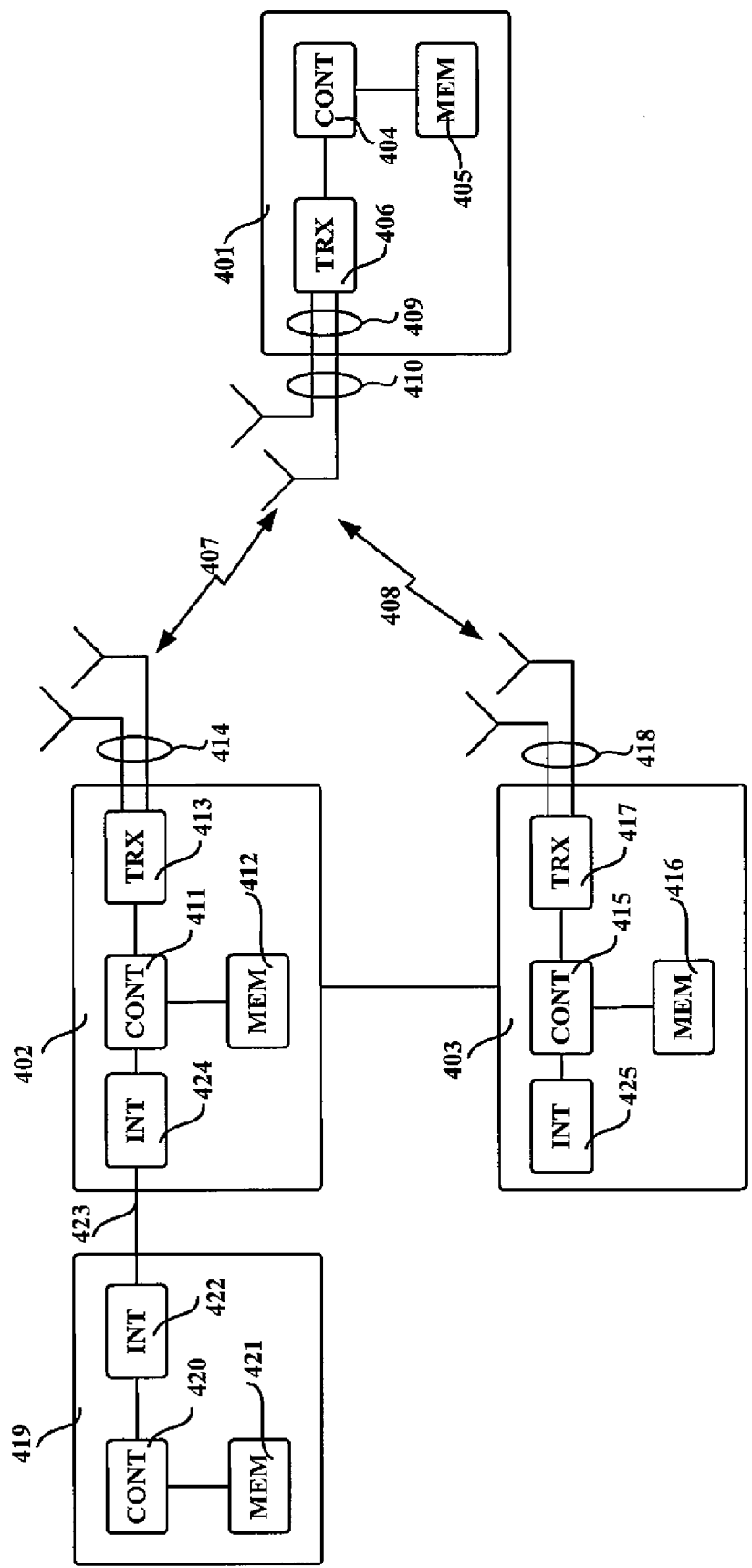
FIG. 4 is a simplified schematic block diagram illustrating apparatuses according to example embodiments of the present invention.

FIG. 4 is a simplified schematic block diagram illustrating apparatuses according to example embodiments of the present invention. As illustrated in FIG. 4, a UE 401 is located in the coverage of radio network nodes 402 and 403 and is configured to be in connection with the radio network node 402 and 403, respectively, for example, in a dual connectivity mode. The UE 401 comprises a controller 404 operationally connected to a memory 405 and a transceiver 406. The controller 404 controls the operation of the UE 401. The memory 405 is configured to store software and data. The transceiver 406 is configured to set up and maintain a wireless connection 407 and a wireless connection 408 to the radio network nodes 402 and 403, respectively. The transceiver 406 is operationally connected to a set of antenna ports 409 connected to an antenna arrangement 410. The antenna arrangement 410 may comprise one or more antennas. The number of antennas is not limited to any particular number. The UE 401 may also comprise various other components, such as a user interface, camera, and media player.

The radio network node 402, such as an LTE BS (or macro eNB), comprises a controller 411 operationally connected to a memory 412, and a transceiver 413. The controller 411 controls the operation of the radio network node 402. The memory 412 is configured to store software and data. The transceiver 413 is configured to set up and maintain a wireless connection (for example, a first connection in the example embodiments of the present invention) to the UE 401 within the service area of the radio network node 402. The transceiver 413 is operationally connected to an antenna arrangement 414. The antenna arrangement 414 may comprise one or more antennas. The number of antennas is not limited to any particular number.

The radio network node 403, such as a small cell BS, comprises a controller 415 operationally connected to a memory 416, and a transceiver 417. The controller 415 controls the operation of the radio network node 403. The memory 416 is configured to store software and data. The transceiver 417 is configured to set up and maintain a wireless connection (for example, a second connection in the example embodiments of the present invention) to the UE 401 within the service area of the radio network node 403. The transceiver 417 is operationally connected to an antenna arrangement 418. The antenna arrangement 418 may comprise one or more antennas. The number of antennas is not limited to any particular number. The radio network node 403 may be operationally connected to the radio network node 402 via an X2-like interface 425. Thereby, the charging information with respect to the second radio connection 408 may be sent to the radio network node 402 through the interface 425.

The radio network node 402 may be operationally connected (directly or indirectly) to a CN entity 419, such as an MME, via which the radio network node 402 may be connected to the PCRF for charging the UE for the wireless services. The network node 419 comprises a controller 420 operationally connected to a memory 421, and an interface 422. The controller 420 controls the operation of the network node 419. The memory 421 is configured to store software and data. The interface 422 is configured to connect to the radio network node 402 via a connection 423 established between the interface 422 and 424. The embodiments are not, however, restricted to the network given above as an example, but a person skilled in the art may apply the solution to other communication networks provided with the necessary properties. For example, the connections between different network elements may be realized with IP connections.

Although the apparatus 401, 402, 403, or 419 has been depicted as one entity, different modules and memory may be implemented in one or more physical or logical entities. The apparatus may also be a user terminal which is a piece of equipment or a device that associates, or is arranged to associate, the user terminal and its user with a subscription and allows a user to interact with a communication system. The user terminal presents information to the user and allows the user to input information. In other words, the user terminal may be any terminal capable of receiving information from and/or transmitting information to the network, connectable to the network wirelessly or via a fixed connection. Examples of the user terminals include a personal computer, a game console, a laptop (a notebook), a personal digital assistant, a mobile station (mobile phone), a smart phone, a communicator, a tablet or a pad.

The apparatus 401, 402, 403, or 419 may generally include a processor, controller, control unit or the like connected to a memory and to various interfaces of the apparatus. Generally the processor is a central processing unit, but the processor may be an additional operation processor. The processor may comprise a computer processor, application-specific integrated circuit (ASIC), field-programmable gate array (FPGA), and/or other hardware components that have been programmed in such a way to carry out one or more functions of an embodiment.

The memory 405, 412, 416, or 421 may include volatile and/or non-volatile memory and typically stores content, data, or the like. For example, the memory 405, 412, 416, or 421 may store computer program code such as software applications or operating systems, information, data, content, or the like for a processor to perform steps associated with operation of the apparatus 401, 402, 403, or 419 in accordance with the example embodiments of the present invention. The memory may be, for example, a random access memory (RAM), a hard drive, or other fixed data memories or storage devices. Further, the memory, or part of it, may be removable memory detachably connected to the apparatus.

The techniques described herein may be implemented by various means so that an apparatus implementing one or more functions of a corresponding mobile entity described with an embodiment comprises not only prior art means, but also means for implementing the one or more functions of a corresponding apparatus described with an embodiment and it may comprise separate means for each separate function, or means may be configured to perform two or more functions. For example, these techniques may be implemented in hardware (one or more apparatuses), firmware (one or more apparatuses), software (one or more modules), or combinations thereof. For a firmware or software, implementation can be through modules (for example, procedures, functions, and so on) that perform the functions described herein. The software codes may be stored in any suitable, processor/computer-readable data storage medium(s) or memory unit(s) or article(s) of manufacture and executed by one or more processors/computers. The data storage medium or the memory unit may be implemented within the processor/computer or external to the processor/computer, in which case it can be communicatively coupled to the processor/computer via various means as is known in the art.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method, comprising:
   receiving, at a first network node and from a second network node, an offloaded request, wherein the first network node has a first connection with a user equipment;
   collecting, at the first network node and in response to the offloaded request, charging information with respect to a second connection between the user equipment and the second network node, wherein the charging information with respect to the second connection includes a public land mobile network identifier associated with the second network node and information relating to at least one of metrics indicating the usage of radio resources provided by the second network node or guaranteed transmitted bit rates;
   combining, to generate combined charging information, charging information with respect to the first connection and the charging information with respect to the second connection; and
   sending the combined charging information from the first network node to a core network entity for charging the user equipment.

2. The method as recited in claim 1, further comprising:
   collecting, from the second network node and when the charging information with respect to the second connection is changed, updated charging information with respect to the second connection.

3. The method as recited in claim 1, further comprising:
   receiving, from the second network node, a stop-charging instruction to stop charging the user equipment for the second connection upon disconnection of the second connection.

4. The method as recited in claim 1, wherein the sending the combined charging information comprises sending the combined charging information via an uplink non access stratum message or a location report message.

5. The method as recited in claim 1, wherein the first network node comprises a macro base station, wherein the second network node comprises a small cell base station, and wherein the core network entity comprises a policy and charging enforcement function entity.

6. An apparatus, comprising:
   at least one processor; and
   at least one memory including compute program instructions, wherein the at least one memory and computer program instructions are configured to, with the at least one processor, cause the apparatus at least to:
   receive, from a second network node, an offloaded request, wherein the apparatus has a first connection with a user equipment;
   collect, in response to the offloaded request, charging information with respect to a second connection between the user equipment and the second network node, wherein the charging information with respect to the second connection includes a public land mobile network identifier associated with the second network node and information relating to at least one of metrics indicating the usage of radio resources provided by the second network node or guaranteed transmitted bit rates;
   combine, to generate combined charging information, charging information with respect to the first connection and the charging information with respect to the second connection; and
   send the combined charging information from the first network node to a core network entity for charging the user equipment, wherein the apparatus comprises and/or is comprised in a first network node.

7. The apparatus as recited in claim 6, wherein the at least one memory and computer program instructions are configured to, with the at least one processor, cause the apparatus at least to:
collect, from the second network node and when the charging information with respect to the second connection is changed, updated charging information with respect to the second connection.

8. The apparatus as recited in claim 6, wherein the at least one memory and computer program instructions are configured to, with the at least one processor, cause the apparatus at least to:
receive, from the second network node, a stop-charging instruction to stop charging the user equipment for the second connection upon disconnection of the second connection.

9. The apparatus as recited in claim 6, wherein the at least one memory and computer program instructions are configured to, with the at least one processor, cause the apparatus at least to:
send the combined charging information via an uplink non access stratum message or a location report message.

10. The apparatus as recited in claim 6, wherein the first network node comprises a macro base station, wherein the second network node comprises a small cell base station, and wherein the core network entity comprises a policy and charging enforcement function entity.

11. A non-transitory computer readable medium including program code which, when executed by at least one processor, causes operations comprising:
receiving, at a first network node and from a second network node, an offloaded request, wherein the first network node has a first connection with a user equipment;
collecting, at the first network node and in response to the offloaded request, charging information with respect to a second connection between the user equipment and the second network node, wherein the charging information with respect to the second connection includes a public land mobile network identifier associated with the second network node and information relating to at least one of metrics indicating the usage of radio resources provided by the second network node or guaranteed transmitted bit rates;
combining, to generate combined charging information, charging information with respect to the first connection and the charging information with respect to the second connection; and
sending the combined charging information from the first network node to a core network entity for charging the user equipment.

12. The non-transitory computer readable medium of claim 11, wherein the operations further comprise:
collecting, from the second network node and when the charging information with respect to the second connection is changed, updated charging information with respect to the second connection.

13. The non-transitory computer readable medium of claim 11, wherein the operations further comprise:
receiving, from the second network node, a stop-charging instruction to stop charging the user equipment for the second connection upon disconnection of the second connection.

14. The non-transitory computer readable medium of claim 11, wherein the sending the combined charging information comprises sending the combined charging information via an uplink non access stratum message or a location report message.

15. The non-transitory computer readable medium of claim 11, wherein the first network node comprises a macro base station, wherein the second network node comprises a small cell base station, and wherein the core network entity comprises a policy and charging enforcement function entity.

* * * * *